Jan. 7, 1936. T. A. WETZEL 2,026,720
CONTROL SYSTEM FOR HEATERS
Filed Dec. 29, 1933 2 Sheets-Sheet 2
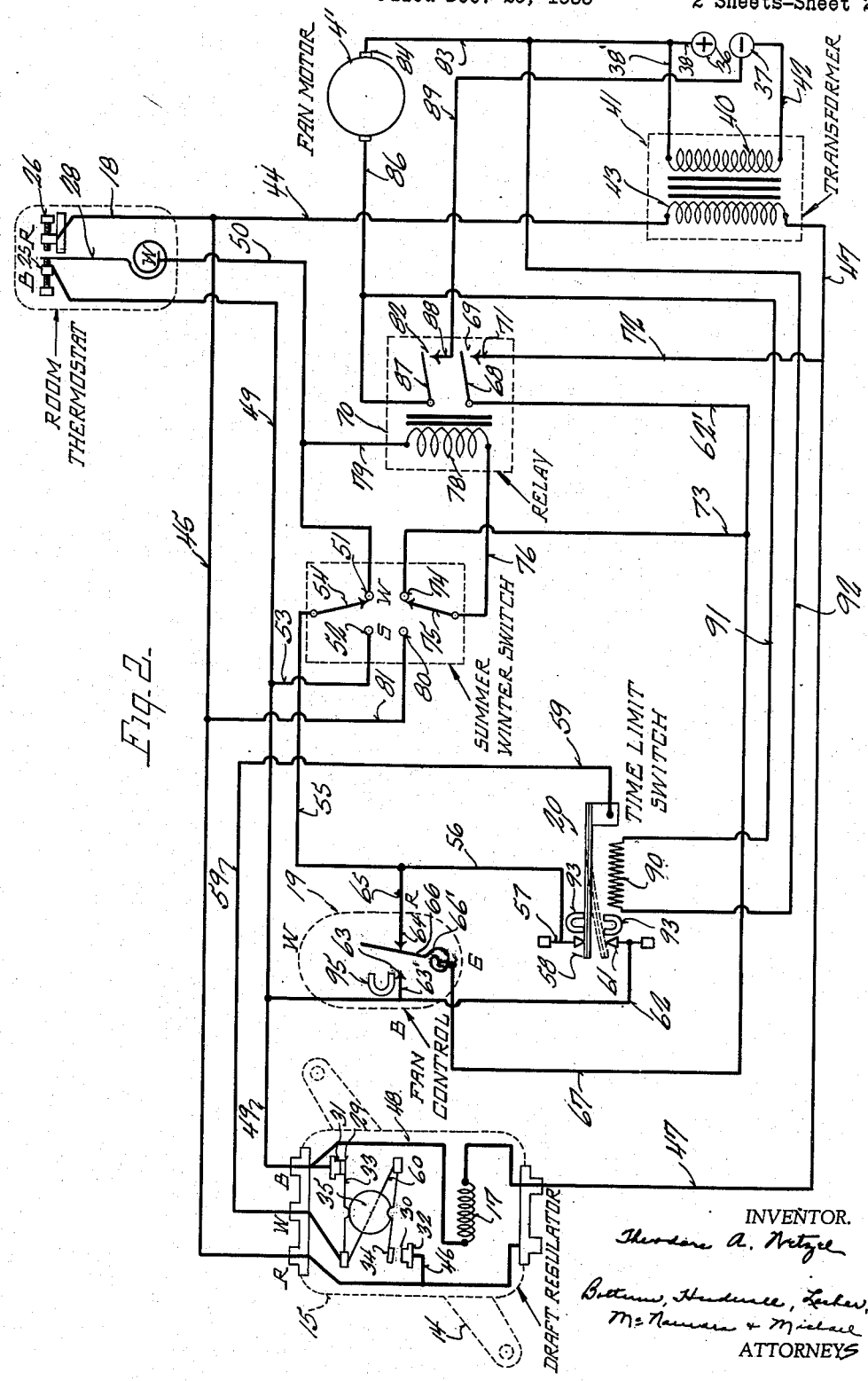
INVENTOR.
Theodore A. Wetzel
ATTORNEYS Patented Jan. 7, 1936

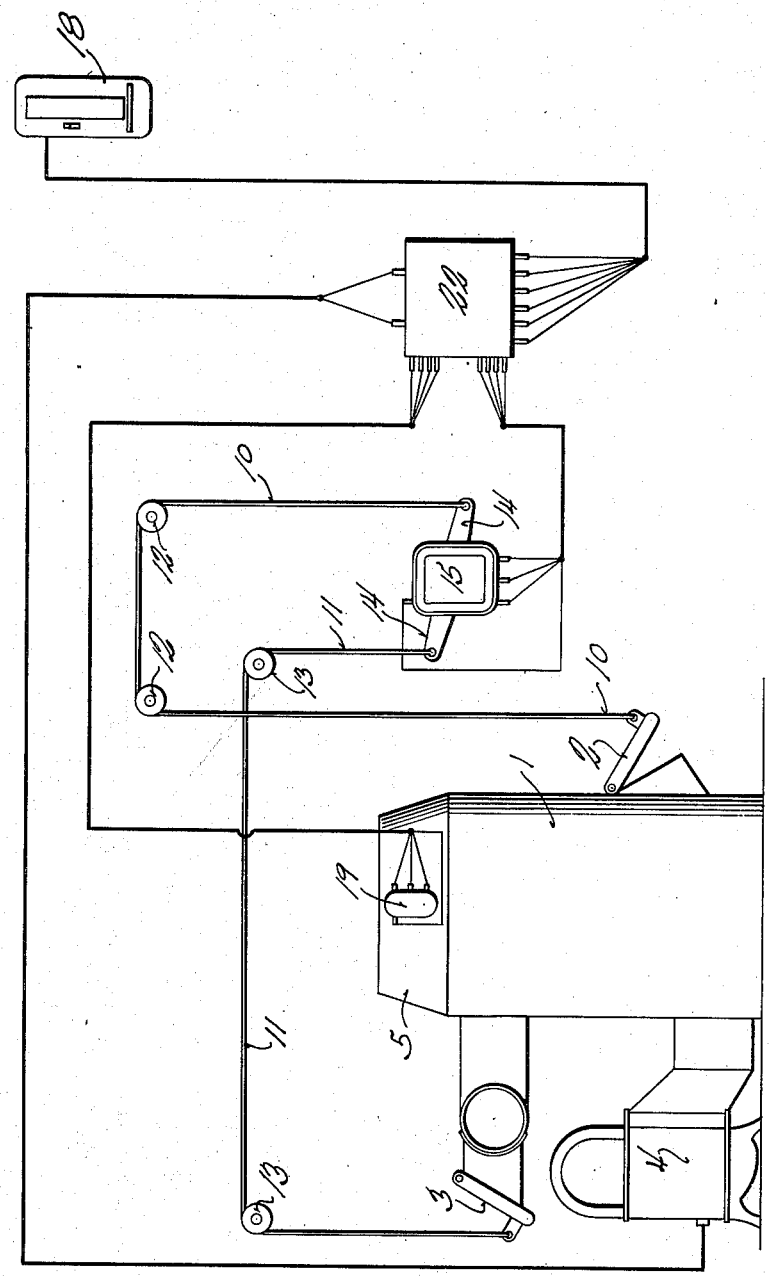

2,026,720

UNITED STATES PATENT OFFICE 2,026,720

CONTROL SYSTEM FOR HEATERS

Theodore A. Wetzel, Wauwatosa, Wis., assignor to Automatic Products Company, Milwaukee, Wis., a corporation of Wisconsin Application December 29, 1933, Serial No. 704,369

8 Claims. (Cl. 236—11)

This invention relates in general to control systems called regulators for use with heaters as, for example, hot air furnaces, hot water heaters or similar types of heating plants.

Heretofore it has been customary to regulate the rate of combustion in a heater by means of a room thermostat which controls the action of a damper regulator. The damper regulator consists of an electric motor functioning to operate an actuating lever which acts through cables to open and close the direct draft and check draft dampers of the heater. In addition to regulating the rate of combustion in the manner mentioned it has also been proposed to regulate the rate of supply of heat circulating medium. For example, with a hot air furnace it has been the practice to use a furnace fan which, when operating, forces a circulation of the hot air. Such fans or their motors are controlled by means of a thermostatic switch arrangement subject to the temperature within the furnace and acting when such temperature rises to a predetermined value to turn the fan on and when the temperature in the heater drops below such value to turn the fan off. These thermostatic switch arrangements are also generally so constituted and combined in the system as to take the control of the damper regulator away from the room thermostat should the temperature within the heater exceed a limit consistent with safety.

The high limit temperature at which the fire is checked is predetermined on the thermostatic switch arrangement and is reached only in the event that the fan is unable to cause the furnace temperature to drop as the cool basement air is blown through the furnace. It is evident that when such a condition is brought about the fire has gained so much headway as to deliver heat at a faster rate than that at which the fan can carry it off from the furnace. During the period in which combustion is being accelerated the fan will periodically operate for short intervals after the fire has come up from a cold start. First, when the fan switch temperature setting is reached within the furnace hood the fan starts operating and continues for only a short period since at such time no prolonged action thereof is necessary to bring about such reduction in the furnace temperature as to cause cessation of fan operation. However, with room thermostat continuing to call for heat and the fire gaining headway the interval of fan operation progressively increases until the temperature of the heater is such as to result in the dampers being closed and acceleration of combustion checked.

The present invention proposes to modify a system of this character by introducing thereinto a control in the nature of a time limit switch which functions to close the dampers after the fan motor has operated for a selected period. The time required for the operation of such time limit switch will, of course, be variable and adapted to the conditions obtaining in any particular installation but will preclude such undue acceleration of combustion as would result from the operation of the present high limit safety switch. As a result substantial economy in the consumption of fuel and the uniform and more desirable operation of the heating plant is had.

Another object of the invention resides in the provision of a control system of this character which is simple and durable in construction, capable of being readily and conveniently installed and reliable, safe and efficient in operation.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a diagrammatic view showing one type of heat regulating system to which the present invention is applicable; and Figure 2 is a diagrammatic view illustrating one manner of combining the control features of the present invention in a system of this character.

Referring to the drawings, and more particularly to Figure 1, it will be seen that in the embodiment of the invention illustrated, the control system has been shown applied to a hot air furnace. It is to be understood that the invention is not restricted to this particular type of heating plant and that this type is shown merely for the sake of simplicity in illustration.

The hot air furnace is designated generally at 1 and is equipped with the usual direct draft damper 2 and check draft damper 3. It is also provided with an air conditioner or fan 4 driven in the usual way by an electric motor indicated diagrammatically at 4' in Figure 2. The fan 4, when running, forces air from the basement up through the hood 5 of the furnace and out through the usual hot air pipes (not shown).

Dampers 2 and 3 are connected by means of cables 10 and 11 with the crank arm or operating lever 14 of a damper regulator designated generally at 15, the cables being guided about suitable pulleys 12 and 13. It will be understood that the arm 14 of the regulator is geared in any suitable way to an electric motor embodied in the regulator and indicated diagrammatically at 17 in Figure 2. Such an electric motor is usually an induction motor of the shaded coil type.

For controlling the operation of the damper regulator and the furnace fan or blower 4, control instrumentalities comprising generally a room thermostat 18, a furnace fan thermostat 19 and a time limit switch 20 are provided, which instrumentalities are connected up with the other elements of the system in the manner illustrated in Figure 2 and which will now be described.

A control box 22 contains the elements of the electrical system except those embodied in the draft regulator 15, room thermostat 18 and furnace fan thermostatic switch 19.

As shown diagrammatically in Figure 2, the room thermostat 18 is of conventional construction and comprises the so-called "blue" and "red" contacts 25 and 26 between which a switch blade 28 operates.

The damper regulator 15 is also conventional and has associated therewith switches 29 and 30 having fixed contacts 31 and 32 and movable contacts 33 and 34, respectively. The movement of the contacts are on the opposite sides of an operating member 35 which is rotated in synchronism with the motor of the damper regulator to alternately open and close these switches 29 and 30 and thereby stop the operation of the motor after the completion of such movement thereof as will effect opening or closing of the dampers. This switch arrangement is a well known expedient.

Power lines (not shown) are connected to the terminals 36 and 37 of the control box 22, as illustrated diagrammatically in Figure 2. The terminal 36 is connected by wires 38 and 38' to one end of the primary coil 40 of a transformer designated generally at 41, whereas the other end of this transformer coil is connected by a wire 42 with the terminal 37. The secondary coil of the transformer 41 is designated at 43 and one end thereof connects by a wire 44 with the so-called "red" contact 26 of the room thermostat. A wire 45 has one end connected to the wire 44 and has its other end connected to a wire 46 which connects up with the fixed contact 32 of the switch 30. The other end of the secondary coil of the transformer is connected by a wire 47 with the winding of the motor 17 of the draft regulator. The other end of this motor winding is connected by means of a wire 48 with a wire 49, one end of which wire 49 is connected to the fixed contact 31 of the switch 29, whereas the other end of this wire 49 is connected with the so-called "blue" contact 25 of the room thermostat. The switch blade 28 of the room thermostat connects by means of a wire 50 with the winter contact 51 of the summer-winter switch. The adjacent fixed contact 52 of this summer-winter switch is connected by means of a wire 53 with the wire 49. As shown in Figure 2, the movable contact 54 of the summer-winter switch is engaged with the fixed contact 51, and it, in turn, is connected by means of wire 55 with one of the fixed contacts 57 of the time limit switch 20.

The time limit switch 20 has a shiftable blade contact 58 which connects by a wire 59 with the shiftable contact 33 of the switch 29. A flexible wire 60 also connects this wire 59 with the shiftable contact 34 of the switch 30.

The time limit switch 20 also has a second fixed contact 61 connected by a wire 62 with the wire 49. A continuation 63' of this wire 62 connects with one of the fixed contacts 63 of the thermostatically operated fan control switch 19. The other fixed contact 64 of this switch 19 connects by a wire 65 with the wire 55. The movable contact 66 of the fan control switch 19, operated by a thermostatic element 66' positioned in the hood of the furnace, is connected by means of a wire 67 with the movable blade 68 of a switch 69 embodied in a relay 70. The fixed contact 71 of this switch 69 is connected by a wire 72 with the return wire 47. The wire 67 is also connected with a wire 73 which leads to a fixed contact 74 of the summer-winter switch. A movable contact 75 of this summer-winter switch connects by means of a wire 76 with one end of a relay coil 78, whereas the other end of this coil 78 connects by means of a wire 79 with the wire 50. It will be noted that the fourth fixed contact 80 of the summer-winter switch connects by means of a wire 81 with the wire 45. The relay coil 78, when energized, not only closes the switch 69 but also closes the switch 82 incorporated in the circuit provided for the fan motor 4'. It will be noted that a wire 83 connects the terminal 36 with one of the motor terminals 84 of fan motor 4'. The other motor terminal is connected by means of a wire 86 with the movable contact 87 of the switch 82. The fixed contact 88 of this switch 82 is connected by means of a wire 89 with the other terminal 37. It will be appreciated that with the switch 82 closed the fan motor is energized whereas opening of the switch 82 stops the motor 4'. It will further be appreciated that the relay coil 70 must be energized to effect closure of the switch 82.

The time limit control switch 20 has a bimetallic strip for its movable contact 58 and in operative relation to this strip 58 is a heating element 90 which is connected by means of wires 91 and 92 across the fan motor circuit so that when the fan is running current will flow through the electric heating element and should the fan run long enough or its periods of operation be closely connected in time of sequence, i. e., frequency of operation is greater, this element will heat the strip 58 to such extent as to cause it to flex away from the fixed contact 57 and into engagement with the fixed contact 61. Snap action of this movable contactor strip 58 may be had by the utilization of permanent magnets 93, as illustrated in Figure 2. The fan control switch 19 may also be provided with a similar permanent magnet 95 for a similar purpose.

With the parts positioned as shown in Figure 2, the room thermostat is satisfied and the fan motor circuit is opened. If now the room temperature drops below the setting of the room thermostat the blade contact 28 will shift over into engagement with the "red" contact 26 with the result that the motor 17 of the draft regulator will be energized to cause opening of the direct and closing of the check draft dampers. At such time current flows from the secondary coil of the transformer, through wire 44, contacts 26, 28, wire 50, contacts 51 and 54, wires 55 and 56, contacts 57 and 58, wire 59, contacts 33 and 31, wires 49 and 48, to the winding of the motor and thence through the winding and back through the return wire 47 to the other end of the secondary coil of the transformer 41. When the motor has completed the opening of the direct and the closing of the check draft dampers the switch 29 will be opened thereby stopping the flow of current through the motor 17 and the switch 30 will be closed to place the system in condition for the subsequent operation of the draft regulator upon satisfaction of the room thermostat and return of its contact 28 into engagement with the contact 25. The dampers being opened, combustion in the furnace is accelerated and the temperature in the hood of the furnace rises until eventually a point is reached where the hood temperature is effective to act on the thermostat of the switch 19 and cause the thermostat to move the blade 66 away from the contact 64 and into engagement with the contact 63, it being understood, however, that the room thermostat still calls for heat. This results in the energization of the relay coil 78, the current flowing from the secondary of the transformer 41 through the wire 44, contacts 26 and 28, wire 50, wire 79, coil 78, wire 76, contacts 75 and 74, wires 73 and 67, contacts 66 and 63, wires 62, 49, 48, winding of motor 17, and return wire 47, back to the other side of the transformer secondary. In the circuit just described the motor 17 and relay coil 78 are in series on the low voltage side of the transformer and the coil 78 will be energized sufficiently to lock or close the low voltage contacts 68, 71 without operating the motor. The energizing of coil 78 also closes the fan motor switch 82. It will be understood that as the low voltage contacts 68, 71 of the relay are locked, the draft regulator motor is shorted out of series, the current flowing as described above till wire 73 is passed then instead of flowing as thus described it will pass to wire 62, contacts 68 and 71, wire 72 and return wire 47 to the secondary. The coil 78 will then take the full current which prevents the contacts 68, 71 from chattering and the regulator motor from running except when the time limit switch 20, fan switch 19 or the room thermostat 18 call for check. In such event, the relay is unlocked by an instantaneous short on the transformer secondary which is broken at the low voltage contact on the relay thereby allowing the relay to open so that the draft regulator motor may then start and complete its cycle. In the last circuit described the current was flowing from the secondary through the wire 44, contacts 26 and 28, wire 50, wire 79, coil 78, wire 76, contacts 75 and 74, wires 73 and 62', contacts 68 and 71, wires 72 and 47 back to the secondary. However, the time limit switch was in the position where contacts 58 and 57 were connected, the fan control switch in the position where contacts 66 and 63 were connected and the regulator motor switch in the position where contacts 34 and 32 were connected. Hence, if the time limit switch is changed so that contacts 58 and 61 are connected the current will flow from the secondary through wires 44, 45 and 46, contacts 32 and 34, wires 60 and 59, contacts 58 and 61, wires 62 and 63', contacts 63 and 66, wires 67 and 62', contacts 68 and 71, wires 72 and 47 and hence back to the secondary. As the coil 78 is not included in the circuit it will become de-energized and the contacts 68, 71 will open. If the fan switch is changed so that contacts 66 and 64 are connected the current will flow from the secondary through wire 44, contacts 26 and 28, wire 50, contacts 51 and 54, wires 55 and 65, contacts 64 and 66, wires 67 and 62', contacts 68 and 71, wires 72 and 47 and back to the secondary. Coil 78 is not included in this circuit and will become de-energized. If the room thermostat is changed so that contacts 28 and 25 are connected the current will flow from the secondary through wires 44, 45 and 46, contacts 32 and 34, wires 60 and 59, contacts 58 and 57, wires 56 and 55, contacts 54 and 51, wire 50, contacts 28 and 25, wires 49, 62, and 63', contacts 63 and 66, wires 67 and 62', contacts 68 and 71, wires 72 and 47 back to the secondary. Coil 78 is not included in this circuit. Hence, if any one of the three changes mentioned is made, while the fan is running and coil 78 is energized, the coil will be shorted out of its circuit with the secondary, become de-energized thereby permitting the switches 69 and 82 to open. Operation of the fan lowers the temperature of the hood of the furnace and at the beginning of acceleration of combustion does not require much time to accomplish this. Upon a predetermined drop, the blade 66, under the influence of its thermostat, shifts over into engagement with the contact 64 whereby the coil 78 is de-energized with consequent opening of the switch 82 and stopping of the fan. As the combustion continues to accelerate the fan periodically turns on and off, the time interval between the stopping and starting of the fan decreases and more and more time is required each time the fan turns on to pull down the temperature in the furnace hood. A point will be reached in which the heat of the heating element 90 caused by the fan operation will not be entirely dissipated before the next period of fan operation. Because of this characteristic any increase of acceleration in the rate of combustion will cause an earlier shifting of the time limit switch and before the rate of combustion has advanced to a point where more heat would be produced than the fan could efficiently distribute, the electric heating element 90 will become so heated up as to cause the bi-metallic strip 58 of the time limit switch to shift over into engagement with the fixed contact 61 thereby causing the draft regulator to move the dampers to check the furnace, notwithstanding the room thermostat still calls for heat. At such time, current flows from the secondary of the transformer through the wires 44 and 45, to the contacts 32 and 34, thence through the flexible wire 60, to wire 59, thence through contacts 58 and 61 to wire 62 and from wire 62 through wires 49 and 48, coil 17, wire 47 back to the other end of this secondary of the transformer. During the operation of the draft regulator motor, the fan, if operating, will be momentarily stopped, but if the hood temperature is still so high as to maintain contacts 66 and 63 engaged, fan operation will be resumed upon the completion of the damper movement. This will result in the electric heating element 90 being further heated and continuing the engagement of the bi-metallic strip 58 with the contact 61. However, when the hood temperature drops below the selected point and the contacts 66 and 64 of the fan control switch 20 are engaged, fan operation will be stopped, the heating element 90 will cool down and the bi-metallic strip will move back into engagement with the contact 57 whereupon should the room thermostat still call for heat, the damper regulator will be operated to open the direct and close the check draft dampers.

The summer-winter switch has two movable blades 54 and 75 which are moved simultaneously by hand from respective connection with contacts 51 and 74 to respective connection with contacts 52 and 80, this latter position being the summer position. When in this position the drafts are always closed and the motor regulator switch and fan control switch remain in the positions shown in Figure 2. When the room temperature is below a set degree the contacts 28 and 26 are connected and the secondary will be on an open circuit which means that the fan motor switch 82 will be open. When the room temperature rises above that set degree the contacts 28 and 25 are connected and the current will flow from the secondary through wires 44, 45, and 81, contacts 80 and 75, wire 76, coil 78, wires 9 and 50, contacts 28 and 25, wires 49 and 48, motor 17, wire 47 back to the secondary 43. Thus, motor 17 and coil 78 will be in series with the secondary and coil 78 will be energized closing the fan switch 82 and low voltage switch 69 without operating the motor. As soon as the low voltage switch 69 is closed the current will flow as above until wire 49 is reached and then it will branch off through wire 53, contacts 52 and 54, wires 55 and 65, contacts 64 and 66, wires 67 and 62', contacts 68 and 71, wires 72 and 47 to the secondary. The coil 78 will then take all the current of the secondary and securely lock the switches 82 and 69 in closed position. The fan will blow air through the system but since there is no fire the air will have a cooling effect. The time limit switch has no control under the summer circuit hence the fan will continue to operate until the room temperature is lowered and the contacts 28 and 26 are moved together breaking the entire circuit and stopping the fan.

While I have shown and described one control system and construction in which the invention may be advantageously embodied, it is to be understood that such has been selected merely for the purpose of illustration or example and that various changes, as will be obvious to one skilled in the art, may be made without departing from the spirit of the invention or the scope of the subjoined claims.

The invention claimed is:

1. A heater control comprising a damper, a fan for circulating air through the heater, a damper regulator, a room thermostat controlling the damper regulator, a thermostatic switch controlling the action of the fan, and a time limit switch subject to the influence of fan operation and exercising a dominant control over the damper for closing the same when the fan is operated for a predetermined period.

2. A heater control having means for regulating the rate of combustion, means for controlling the supply of a heat conducting medium, thermostatic means for regulating the action of the aforesaid means, and a time limit switch regulated in its action by said second-named means and exerting a dominant control over the first-named means after the second-named means has operated for a predetermined time.

3. A heater control having means for regulating the rate of combustion, means for controlling the supply of heat conducting medium, electrical thermostatic means for regulating the action of the aforesaid means and a time limit switch including a heating element energized when said second-named means is in operation, a bi-metallic switch element influenced by said heating means and contacts with which said bi-metallic element alternately cooperates, said contacts and said bi-metallic switch element being associated with said thermostatic electrical means whereby the time limit switch exerts a dominant control over the first-named means after the second-named means is operated for a predetermined time.

4. A heater control comprising a damper, a damper regulator having an electric motor for operating the same, a circuit for said motor, a room thermostat incorporated in said circuit and normally regulating the opening and closing thereof, a fan for forcing the circulation of air through said heater, an electric motor for operating said fan, a circuit for said fan motor interrelated with the circuit for the first-named motor, a switch in said fan motor circuit, a thermostat subject to the heater temperature for opening and closing said switch, and a time limit switch incorporated in the circuit for the first-named motor and subject to the influence of the circuit for the second-named motor for closing said damper upon operation of said fan for a predetermined period.

5. A heater control comprising a damper, a damper regulator therefor, a room thermostat controlling said regulator, a motor operated fan for enforcing air through the heater, a thermostatic switch subject to the heater temperature for regulating the operation of the fan, and a time limit switch controlled in its action by the fan operation and exerting a dominant control over the damper regulator when the fan has operated for a predetermined period.

6. A heater control comprising a damper, a damper regulator having an electric motor for operating the same, a circuit for said motor, a room thermostat incorporated in said circuit and normally regulating the opening and closing thereof, a fan for forcing the circulation of air through said heater, an electric motor for operating said fan, a circuit for said fan motor inter-related with the circuit for the first-named motor, a switch in said fan motor circuit, a thermostat subject to the heater temperature for opening and closing said switch, and a time limit switch including fixed contacts and a shiftable bi-metallic contact incorporated in the circuit for the first-named motor and also including a heating element incorporated in the fan motor circuit whereby to leave the control of the damper regulator motor to the room thermostat except after operation of the fan for a predetermined period.

7. A heater control having means for regulating the rate of combustion, means for controlling the supply of a heat conducting medium, and means related with said second-named means for exercising a dominant control over said first-named means, said last-named means being directly influenced by said second-named means to exercise said dominant control.

8. In a heater control, means for regulating the rate of combustion, means operating to control a supply of a heat conducting medium, thermostatic means responsive to heater temperature and preventing said second-named means from operating when said heater temperature is below a predetermined degree and means utilizing the length and frequency of the time of operation of said second-named means and related with said second-named means to exercise a dominant control over said first-named means.

THEODORE A. WETZEL.